United States Patent [19]

Papadopulos

[11] 4,362,016
[45] Dec. 7, 1982

[54] POLLUTION CONTROL DEVICE FOR AUTOMOBILE EXHAUST

[76] Inventor: Stephen C. Papadopulos, 114 38th St., Union City, N.J. 07087

[21] Appl. No.: 241,528

[22] Filed: Mar. 9, 1981

Related U.S. Application Data

[63] Continuation-in-part of Ser. No. 84,741, Oct. 15, 1979, abandoned, and a continuation-in-part of Ser. No. 969,661, Dec. 15, 1978, abandoned, and a continuation-in-part of Ser. No. 881,015, Feb. 24, 1978, abandoned.

[51] Int. Cl.³ .......................... F01N 3/26; F01N 3/28; F01N 3/38
[52] U.S. Cl. ....................................... 60/297; 60/303; 60/299; 422/169; 422/174; 422/171; 422/176; 422/177; 422/49
[58] Field of Search ............... 422/168, 169, 170, 171, 422/174, 180, 49, 176; 60/303, 297; 313/125, 146, 149; 123/169 R, 169 EA

[56] References Cited

U.S. PATENT DOCUMENTS

| | | | |
|---|---|---|---|
| 1,008,178 | 11/1911 | Messerschmid | 123/169 R |
| 1,119,144 | 12/1914 | Enos | 313/125 |
| 1,858,637 | 5/1932 | McDonald | 422/174 |
| 2,728,408 | 12/1955 | Deliman | 422/174 |
| 3,146,072 | 8/1964 | Morgan | 422/174 |
| 3,350,878 | 11/1967 | Lambert | 422/174 |
| 3,468,634 | 9/1969 | Paaletta | 422/174 |
| 3,499,282 | 3/1970 | Celayan | 60/303 |
| 3,524,316 | 8/1970 | McKee | 422/174 |
| 3,547,592 | 12/1970 | Gladu et al. | 60/303 |
| 3,952,507 | 4/1976 | Bonarski | 422/174 |

Primary Examiner—Michael S. Marcus
Attorney, Agent, or Firm—Robert E. Burns; Emmanuel J. Lobato; Bruce L. Adams

[57] ABSTRACT

A pollution control device for reducing pollution of the atmosphere by automobile exhaust gases comprises a chamber in the exhaust line and at least one pair of electrode units installed in the chamber wall. Each pair of electrode units comprises two casings installed a short distance apart in the chamber wall, an insulator extending through each casing and an electrode wire extending through each insulator into the chamber. Inner ends of the electrode wires are bent and one of the insulators together with the respective wire is rotatable so that by such rotation the distance between the inner ends of the wire can be varied. High voltage current is supplied to the electrode wires and the rotatable insulator is controlled to bring the inner ends of the electrode wires close together to initiate a discharge when the engine is started and then increasing the gap to about one inch to provide a continuous flame which burns off carbon CO and any other combustible ingredients in the exhaust gases.

18 Claims, 13 Drawing Figures

POLLUTION CONTROL DEVICE FOR AUTOMOBILE EXHAUST

REFERENCE TO PRIOR APPLICATION

This application is a continuation-in-part of my application Ser. No. 084,741 (now abandoned) filed Oct. 15, 1979 and a continuation-in-part of my application Ser. No. 969,661 (now abandoned) filed Dec. 15, 1978 and a continuation-in-part of my application Ser. No. 881,015 (now abandoned) filed Feb. 24, 1978.

FIELD OF INVENTION

The present invention relates to a pollution control device for reducing pollution of the atmosphere by automobile exhaust gases.

BACKGROUND OF THE INVENTION

By reason of the large number of automobiles operated in congested areas such as large cities, pollution of the atmosphere by the automobile exhaust gases has become an increasingly serious problem. Many efforts have been made to decrease such pollution. Among such efforts is the installation of a catalytic converter in the exhaust line of the vehicle. However, a catalytic converter is an expensive piece of equipment which materially increases the cost of a car on which it is installed. Moreover, it is not wholly effective or reliable. A further disadvantage is that it requires the use of unleaded gasoline and thereby reduces the performance of the car.

Another means that has been tried for reducing pollution is to recycle a portion of the exhaust gases by introducing it into the intake manifold of the engine. While this results in subjecting the recycled portion of the exhaust gases to a second combustion, it has the disadvantage of reducing the amount of oxygen available in the charge for combustion so that the combustion is less complete than it would be if an excess of oxygen were available.

Another approach to the problem of reducing pollution of the atmosphere by automobile exhaust gases is to provide sophisticated electronic gear for sensing relevant variables such as engine speed, engine temperature, ambient temperature and ambient pressure and controlling the fuel charge and in some instances the recycling of a portion of the exhaust in accordance with a computerized evaluation of such variables. However, such equipment is expensive and although it is theoretically effective it is so complex that malfunctioning can readily occur.

Thus although the problem of reducing pollution of the atmosphere by automobile exhaust gases has long existed and although many proposals have been made, no simple, effective and economically feasible solution to the problem has been found.

SUMMARY OF THE INVENTION

It is accordingly an object of the present invention to provide a pollution control device for reducing pollution of the atmosphere by automobile exhaust gases in a simple, effective and economical manner. In accordance with the invention a pair of electrodes are installed on a muffler in the exhaust line of an automobile engine with inner end portions of the electrodes extending inside the muffler casing and electrically insulated from the casing and from each other. High voltage electric current is supplied to the electrodes to produce a continuous arc or flame between the inner ends of the electrodes inside the muffler casing while the engine is running. Moreover, at least one of the electrodes is movable and is controlled so as to bring inner end portions of the electrodes closer together to initiate sparking when the engine is started and thereafter moving the inner end portions of the electrodes farther apart to increase the length of the discharge path between them. Preferably a pair of such electrodes is installed in each end of the muffler so that in passing through the muffler, the engine exhaust gases are exposed sequentially first to the flame produced by one pair of electrodes and thereafter to the flame produced by the other pair of electrodes.

BRIEF DESCRIPTION OF DRAWINGS

The nature, objects and advantages of the invention will be more fully understood from the following description of preferred embodiments shown by way of example in the drawings in which.

DESCRIPTION OF PREFFERED EMBODIMENTS

Figure 1:
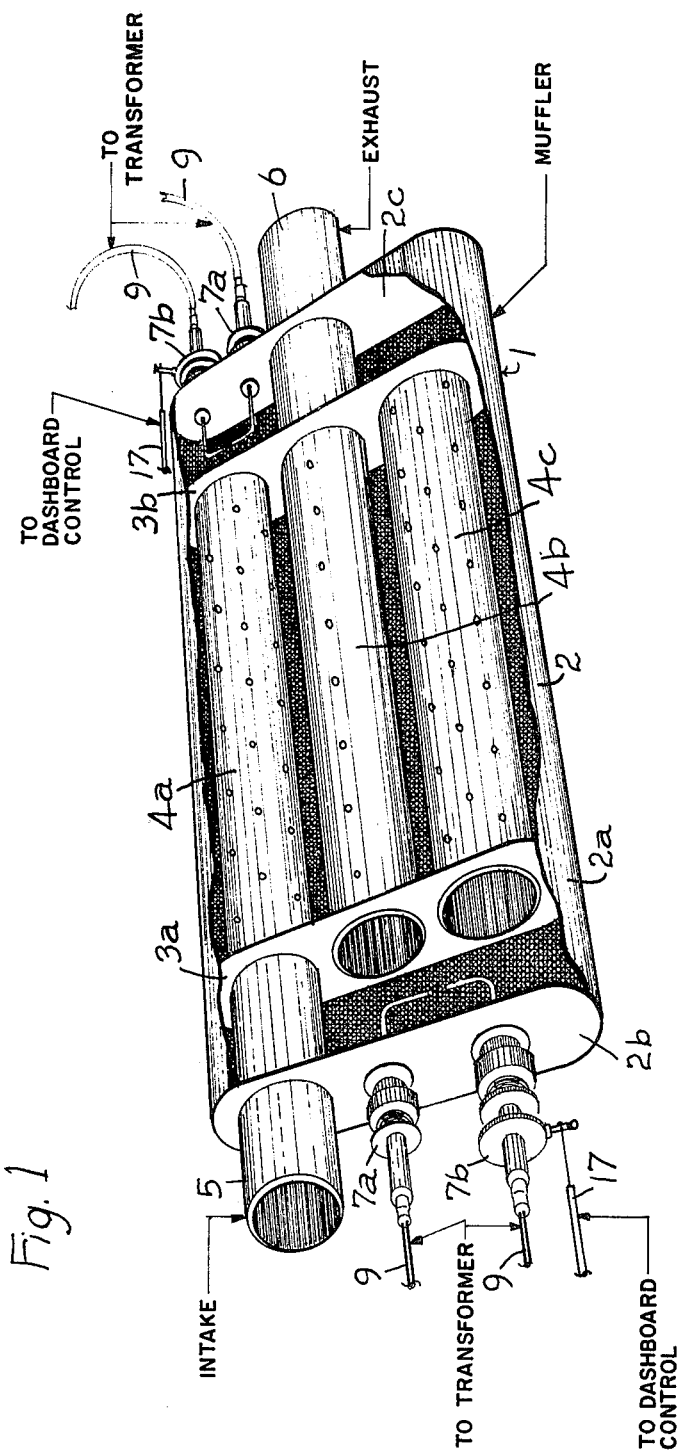
FIG. 1 is a cut away perspective view showing a first embodiment of a pollution control device in accordance with the invention installed on a muffler.

In FIG. 1 of the drawings a pollution control device for reducing pollution of the atmosphere by automobile exhaust gases is shown installed on the muffler 1 in an automobile exhaust line. The muffler is shown by way of example as comprising a casing 2 having a flattened cylindrical peripheral wall 2a and opposite end walls 2b and 2c. Inside the casing 2 there are two transverse bulkheads 3a and 3b which are parallel to and spaced from the end walls 2b and 2c respectively. Extending between the bulkheads 3a and 3b there are three perforated pipes 4a, 4b and 4c. An intake pipe 5 is connected with the perforated pipe 4a while exhaust pipe 6 is connected with the opposite end of the central perforated pipe 4b. The intake 5 is connected with the exhaust line coming from the engine. The exhaust pipe 6 is connected to a tailpipe or in some instances to a second muffler. It will be understood that the muffler illustrated in FIG. 1 is shown only by way of example and that the pollution control device in accordance with the present invention is equally applicable to mufflers of other construction.

In accordance with the invention, means is provided for producing a continuous electric arc or flame inside the muffler casing to burn off noxious components of the exhaust gas, for example carbon monoxide, nitrous oxide, hydrocarbons and free carbon. The continuous arc or flame is produced by means of a pair of electrode units 7a and 7b installed on the muffler for example in an end wall of the muffler casing. For economy of production the two electrode units are shown as being alike except for such difference as is herein pointed out. Each of the electrode units is shown as comprising an electrode 8 having a cylindrical shank portion 8a and an inner end portion 8b which is of reduced diameter and is bent to provide a laterally projecting tip portion 8c. The inner end portion or at least the tip portion 8c is formed of a durable electrically conducting material such as tungsten which is resistant to erosion by electric arcing. At its outer end the electrode 8 is provided with a threaded portion 8d and a terminal portion 8e provided with a snap clamp 8f for connection to a conductor 9 for supplying high voltage electric current to the electrode.

The electrode 8 extends though a tubular porcelain insulator 10 and is secured in the insulator by a flange 8g on the electrode which engages the inner end of the insulator and a nut 11 which is screwed onto the threaded portion 8d of the electrode and engages the opposite end of the insulator. The electrode and tubular porcelain insulator are thereby secured together in fixed relation to one another and so as to provide a gas-tight seal between them.

The tubular porcelain insulator 10 is received in the cylindrical bore of a receptical 12 having an internally threaded enlarged portion 12a to receive a packing ring 13. An externally threaded gland nut 14 screws into the internally threaded enlarged portion 12a of the receptical 12 to apply pressure to the packing 13 and thereby provide a gas-tight seal between the porcelain insulator 10 of the electrode and the receptical 12. The receptical 12 is provided with a flange 12b for mounting the electrode unit on an end wall of the muffler casing 2. The electrode unit is mounted in such manner that the inner end of the insulator 10 and the inner end portion 8b of the electrode 8 are located inside the muffler casing as seen in FIG. 1. The receptical 12 is secured to the end wall of the muffler casing in any convenient manner for example by screws extending through screw holes (not shown) in the mounting flange 12b. A gasket 15 is provided between the flange 12b of the receptical 12 and the wall of the muffler casing to provide a gas-tight seal.

Figure 2:
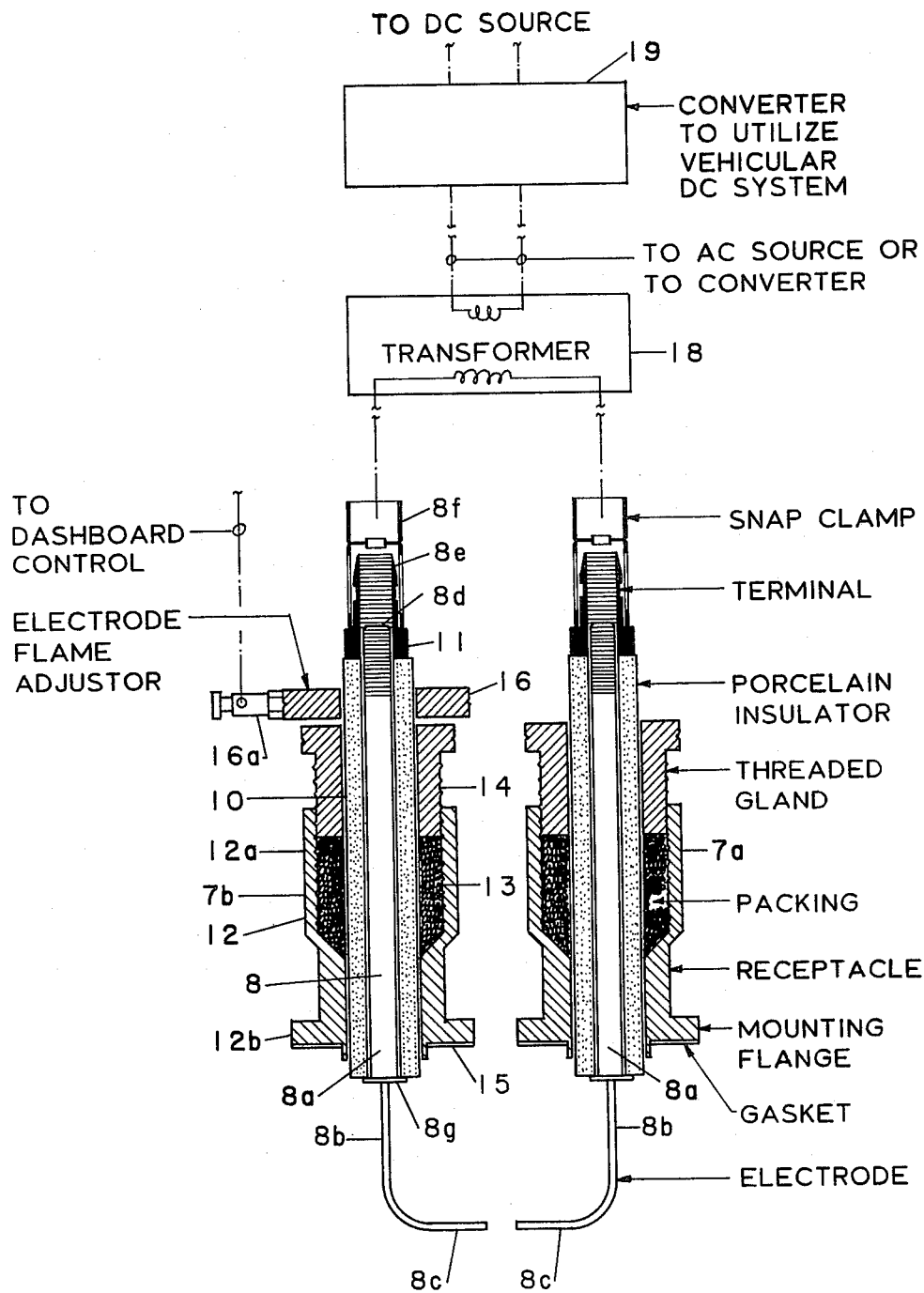
FIG. 2 is a longitudinal sectional view of a pair of electrodes of the control device shown in conjunction with a simplified circuit diagram of a circuit for supplying high tension electric current to the electrodes.

The two electrode units of a pair are mounted on the end wall of the muffler casing so that when the bent inner end portions 8b of the electrodes 8 are turned toward one another, as illustrated in FIGS. 1 and 2, the tip portions 8c are about $\frac{1}{8}$" apart. In order to be able to increase the gap between the tips of the electrodes after arcing between the electrodes has been initiated, means is provided for rotating at least on of the electrodes. For this purpose a collar 16 is secured on an outer end portion of the porcelain insulator 10 of the electrode. A radially projecting arm 16a on the collar 16 is provided with means for attachment to control means, for example a Bowden wire 17, which extends to a control button on the dashboard of the vehicle. The control is operable to reduce the gap between the tip portions 8c of the electrodes to, for example $\frac{1}{8}$" for initiating a discharge between the electrodes and the gap is then increased for example to $1\frac{1}{2}$ to provide a longer arc or flame. The control of the electrodes is preferably coordinated with the starting of the engine to provide a small gap initially and then to increase the length of the gap when the engine has started. Instead of being connected to an individual control button on the dashboard, the electrode control may be, for example, coordinated with a manual or automatic choke control.

Means is provided for applying high voltage electric current to the electrodes of a pair. Thus as illustrated schematically by way of example in FIG. 1, the electrodes are connected to the high voltage output of a transformer 18. The input of the transformer is connected to an AC source, for example to a converter 19 which converts the direct current of the electrical system of the vehicle to alternating current. The voltage supplied by the transformer 18 is sufficient to initiate an arc between the electrodes when the tip portions are spaced about $\frac{1}{8}$" apart and to maintain a continuous discharge when the spacing between the electrodes is thereafter increased to about $1\frac{1}{2}$".

As shown by way of example of FIG. 1, two pairs of electrode units are provided, one pair being mounted on the end wall 2b of the muffler casing and the other pair being mounted on the end wall 2c. The pair of electrodes mounted on the end wall 2c is located in front of the discharge end of the perforated pipe 4a to which the muffler intake 5 is connected to that the exhaust gases coming from the engine are subjected to the discharge of these electrodes. The exhaust gases then pass back through the perforated pipe 4c to the opposite end of the muffler casing where the second pair of electrodes is mounted so that the exhaust gases are again subjected to the electric arc or flame between the electrodes before passing through the perforated pipe 4b and the exhaust pipe 6. Thus in passing through the muffler the exhaust gases are subjected sequentially to two electric arcs provided by the two pairs of electrodes.

A further embodiment of the invention illustrated in FIGS. 3-6 comprises a cylindrical casing 20 having a cylindrical wall 20a and end walls 20b and 20c. In the end wall 20b there is provided a central inlet connection 21. In the end wall 20c there is provided a central exhaust connection 22. The device is connected in the exhaust line so that exhaust gases from the engine flow into the casing 20 through the inlet 21 and out through the outlet 22. The device may be located at any desired place in the exhaust line either before or after the muffler but preferably is ahead of the muffler and fairly near the engine so that exhaust gases entering the casing are still at high temperature.

In approximately the center of the casing 20 there is mounted a dome shaped ceramic coated baffle 23 supported from the cylindrical wall of the casing by three or more radially extending supports 24. As illustrated by way of example in the drawings there are four such supports. The convex side of the baffle 24 faces the inlet 21 of the casing. The baffle is of smaller diameter than the casing so as to leave an annular passageway for flow of exhaust gases between the periphery of the baffle and the cylindrical wall of the casing 20.

Figure 3:
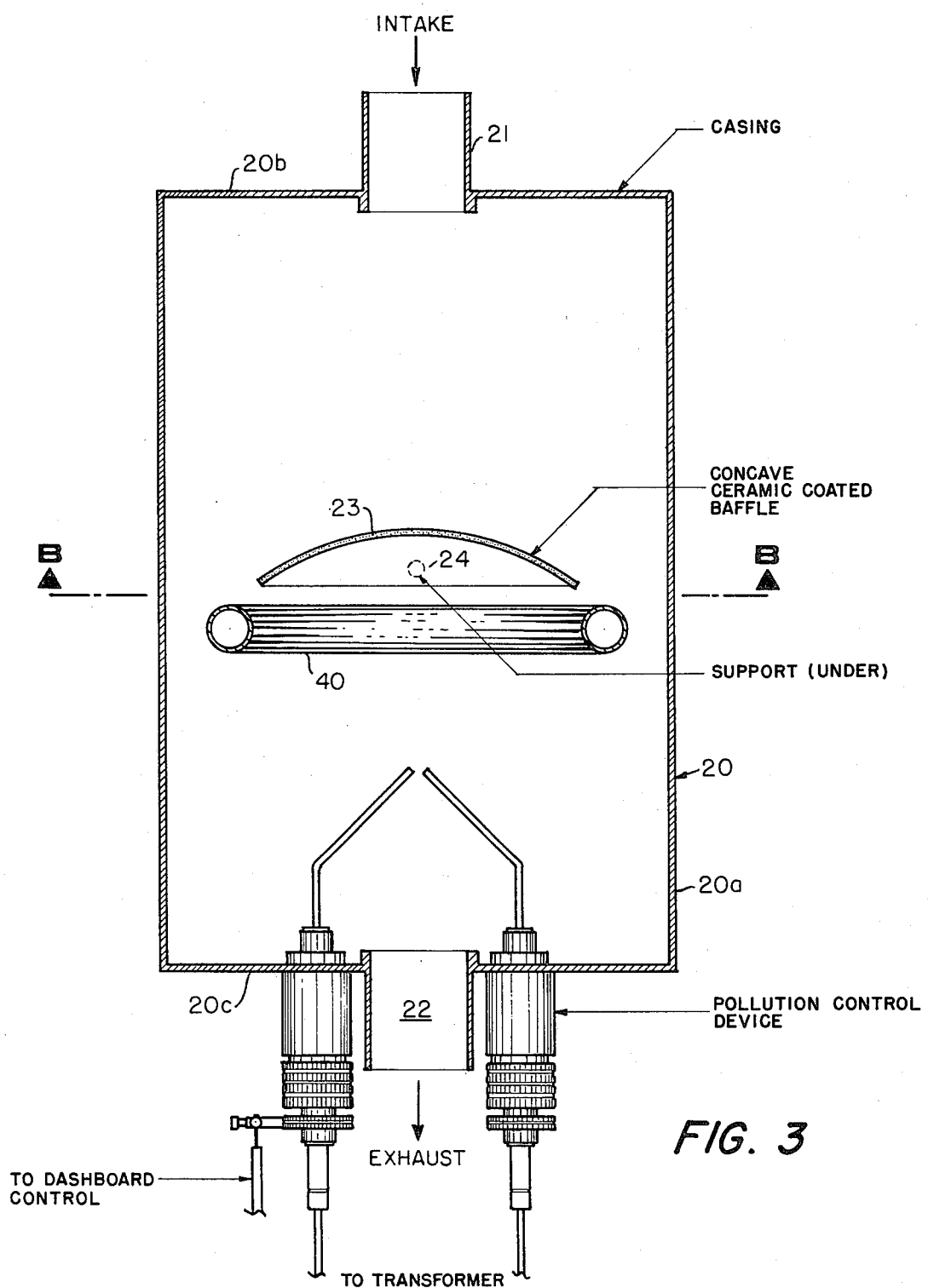
FIG. 3 is a longitudinal section of a second embodiment of the invention taken approximately on the line A—A in FIGS. 4 and 5.
Figure 4:
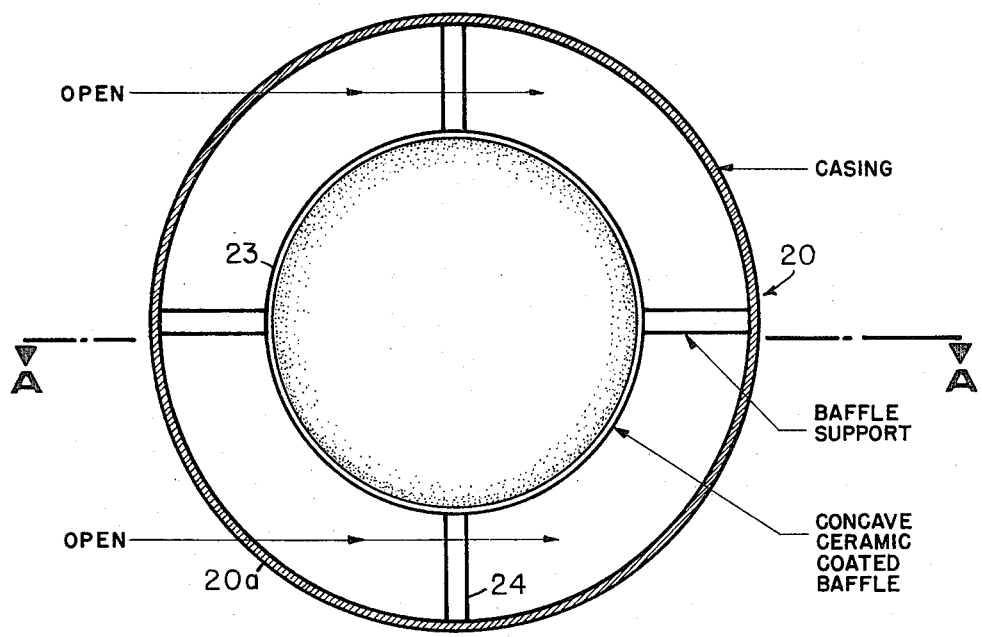
FIG. 4 is a cross section taken approximately on the line B—B in FIG. 3.
Figure 5:
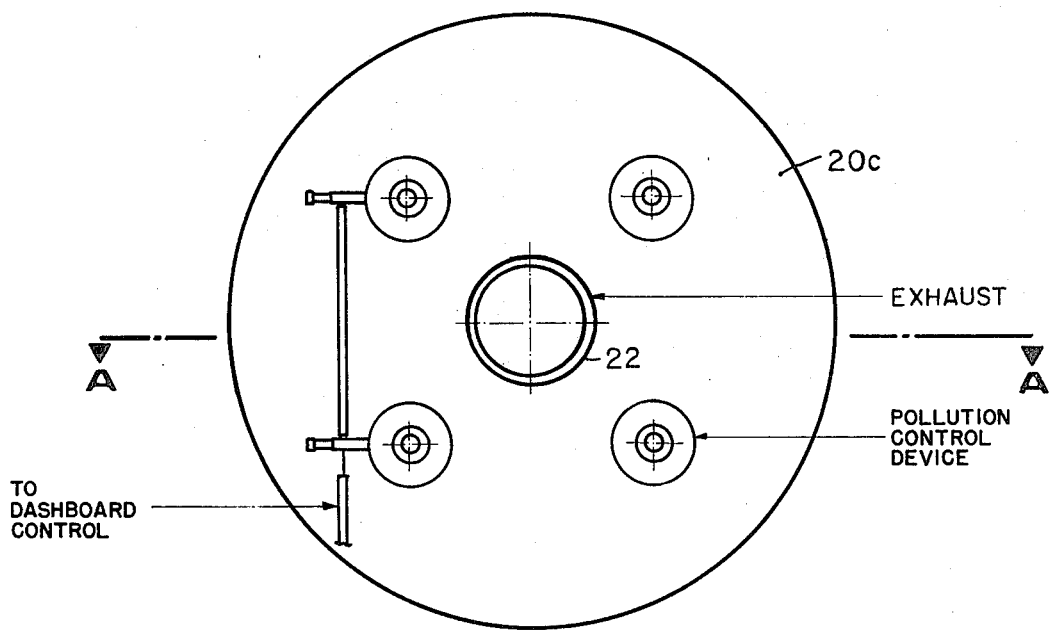
FIG. 5 is an end view of the exhaust end of the casing.
Figure 6:
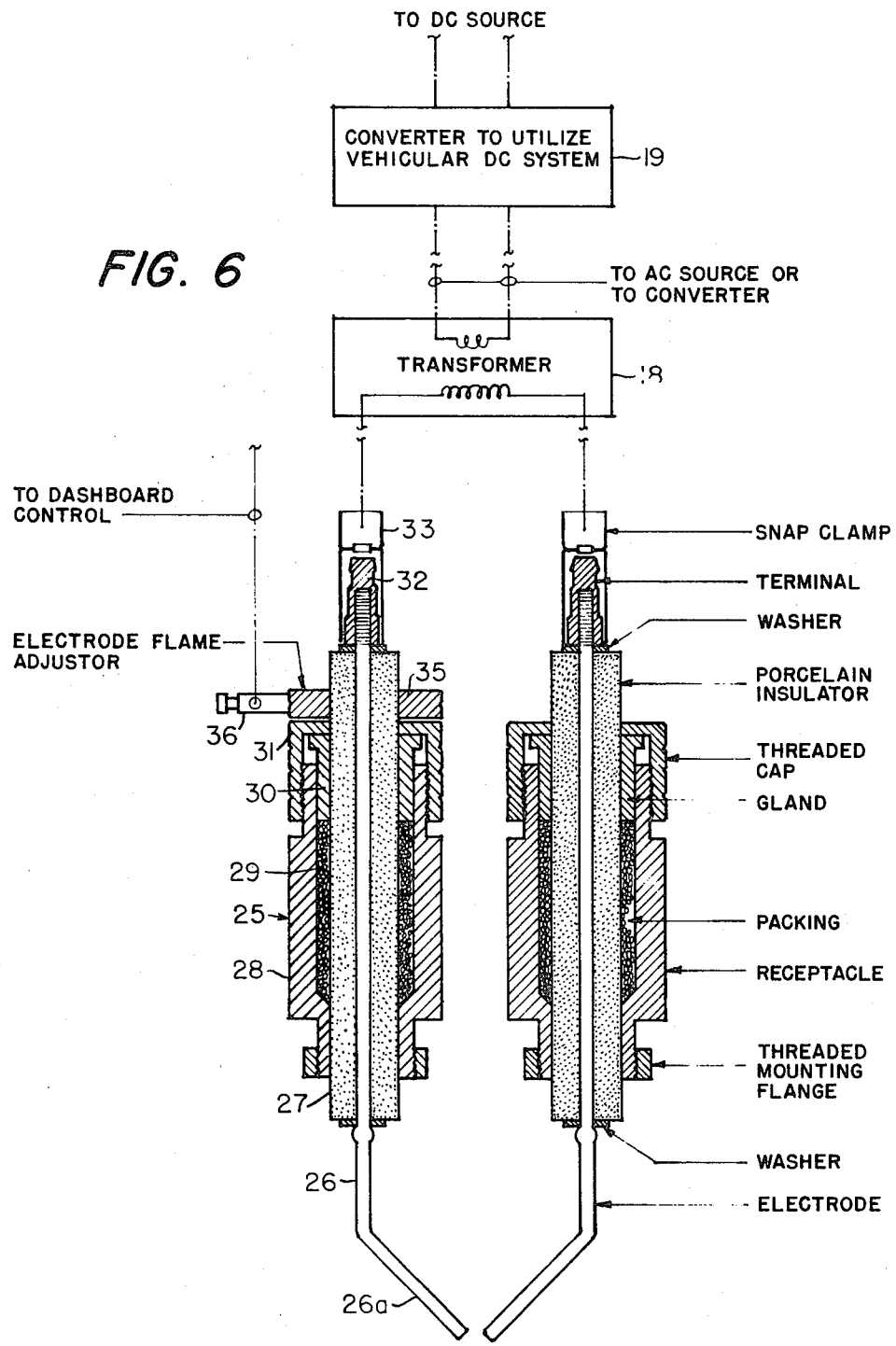
FIG. 6 is a detailed view of the electrodes with a schematic of the circuitry.

In the end wall 20c of the casing there are mounted two pairs of electrode units 25 which are positioned in the manner shown in FIGS. 3 and 5. Each of the electrode units 25 comprises an elongated electrode 26 which extends through a ceramic insulator 27. The insulator is mounted in a tubular casing 28 with a seal provided by packing 29, gland 30 and threaded cap 31. The electrodes 26 are straight except for an inner end portion 26a which is bent at an angle as seen in FIG. 6. The outer end of each terminal 26 is threaded to receive a terminal 32 for connection to a snap clamp 33 in the same manner as connections of spark plugs of an internal combustion engine.

All of the electrode units are alike except that one unit of each pair has a collar 35 nonrotatably fixed on an outer end portion of the insulator 27. The collar 35 has a radially projecting arm 36 provided for connection to a control cable, for example a Boden wire leading to the dashboard of the vehicle. As described above with respect to the embodiment shown in FIG. 1, the electrodes are connected to a high voltage AC source for example a transformer 18, the input terminals of which are connected with an AC or intermittent voltage source for example a converter connected with the DC system of the vehicle.

As described above, the controls provided for rotating one of the electrodes of each pair makes it possible to change the gap between the inner ends of the two terminals of a pair. When the engine is being started the gap between the tip portions of the terminals is about ⅛ inch. The voltage supplied by the transformer 18 is sufficient to initiate an arc between the terminals. When the engine starts one of the electrodes of each pair is rotated by means of the collar 35 and arm 36 so as to increase the gap to about one inch thereby providing a continuous flame between the tips of the electrodes of each pair. The operation is thus in the same manner as described above.

To further increase the efficiency and effectiveness of the device, an electrical resistance element may be provided in the casing 20 in position to heat the exhaust gas and thereby raise its temperature before it reaches the flames produced by the electrode units. Such resistance is shown by way of example in the drawings as a heating coil 40 which is shown schematically in FIG. 3 as being located in the gap between the periphery of the baffle 23 and the cylindrical wall 20a of the casing 20. Thus the exhaust gases deflected outwardly by the domed baffle 23 flow over the annular resistance unit 40 and are thereby heated. The heating coil 40 is suitably supported by insulating supports which are of conventional type and hence not shown in the drawing.

Figure 7:
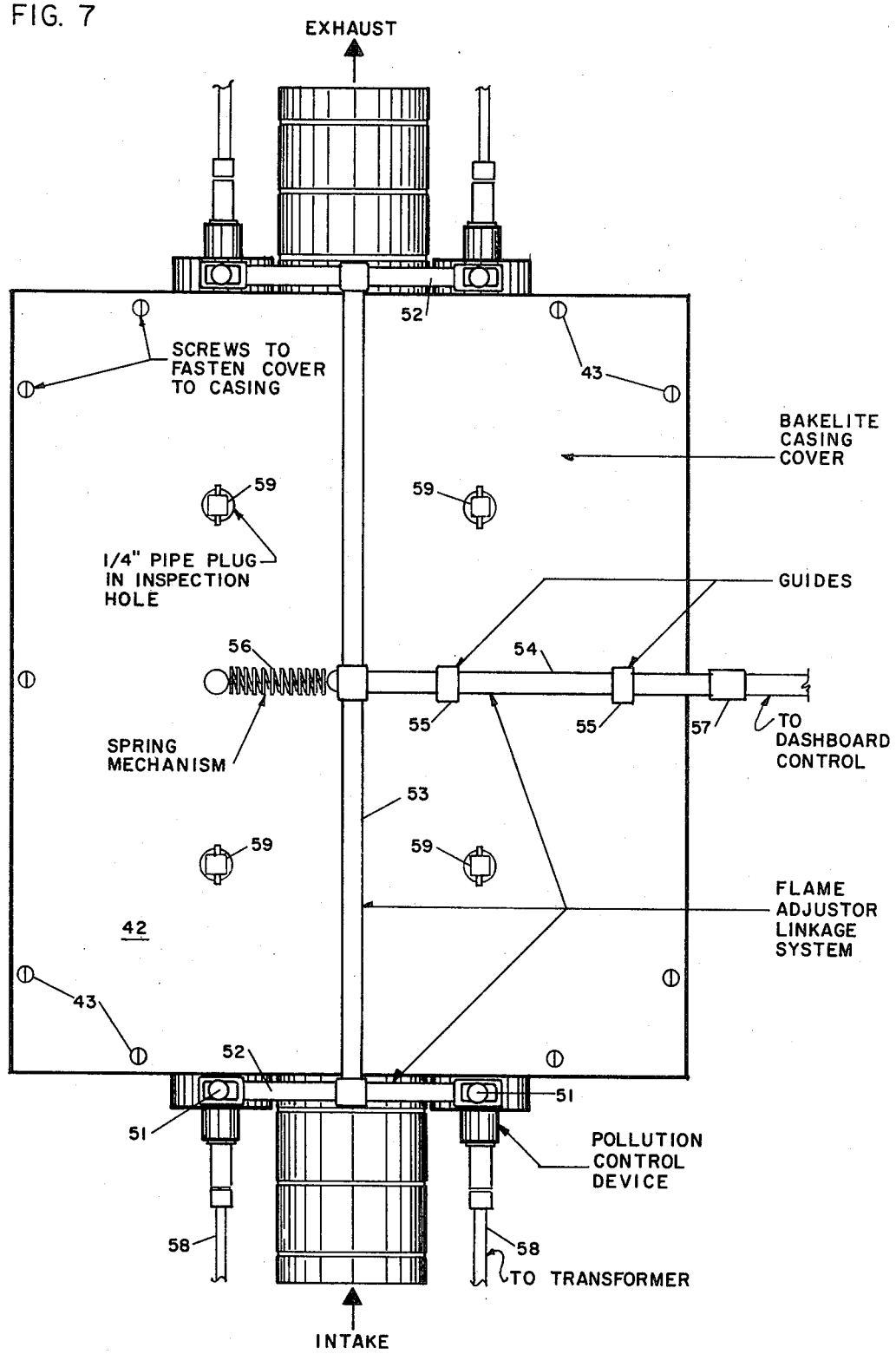
FIG. 7 is a top view of a third embodiment of the invention.
Figure 8:
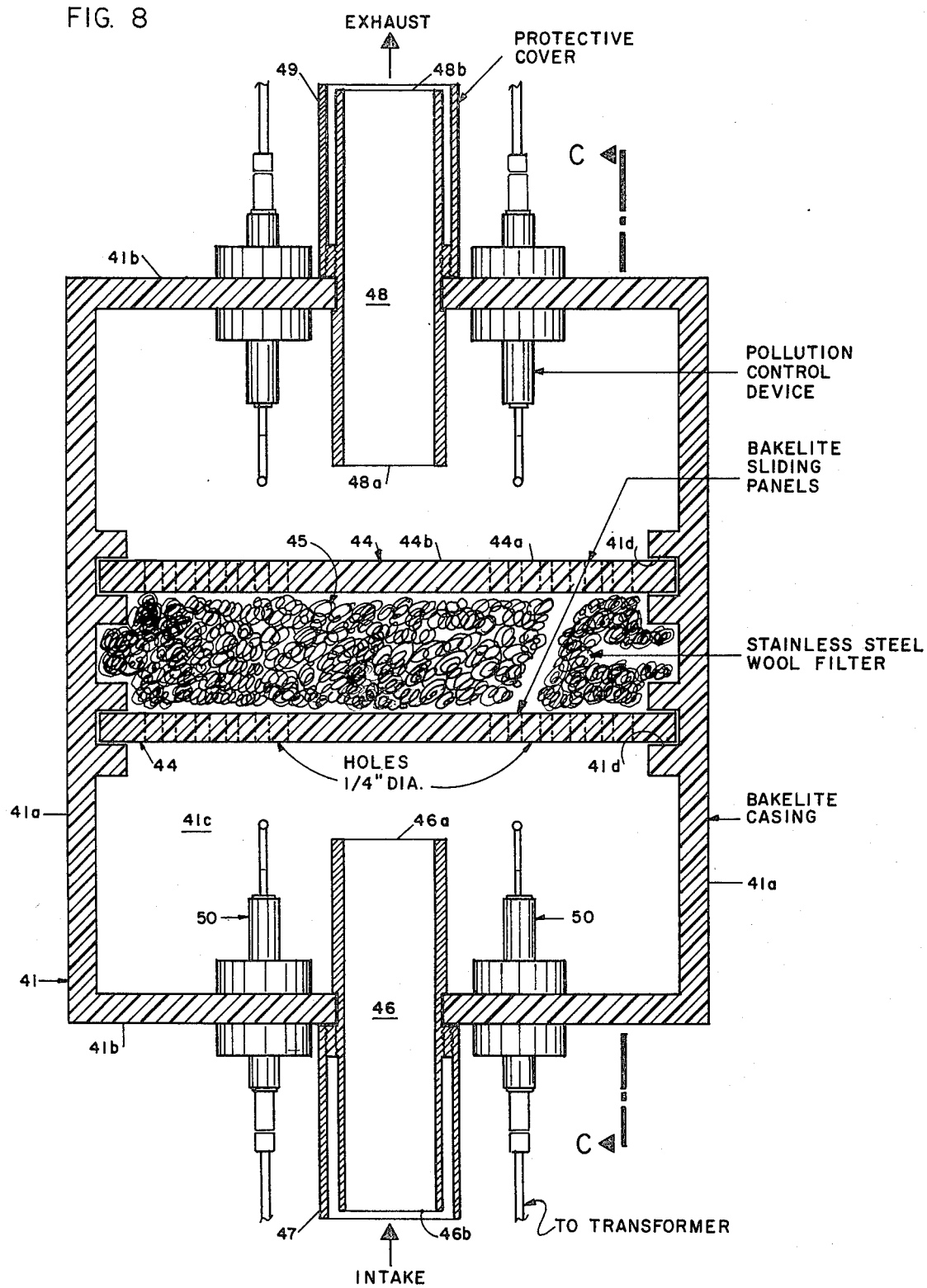
FIG. 8 is a plan view partially in section of the embodiment of FIG. 7.
Figure 9:
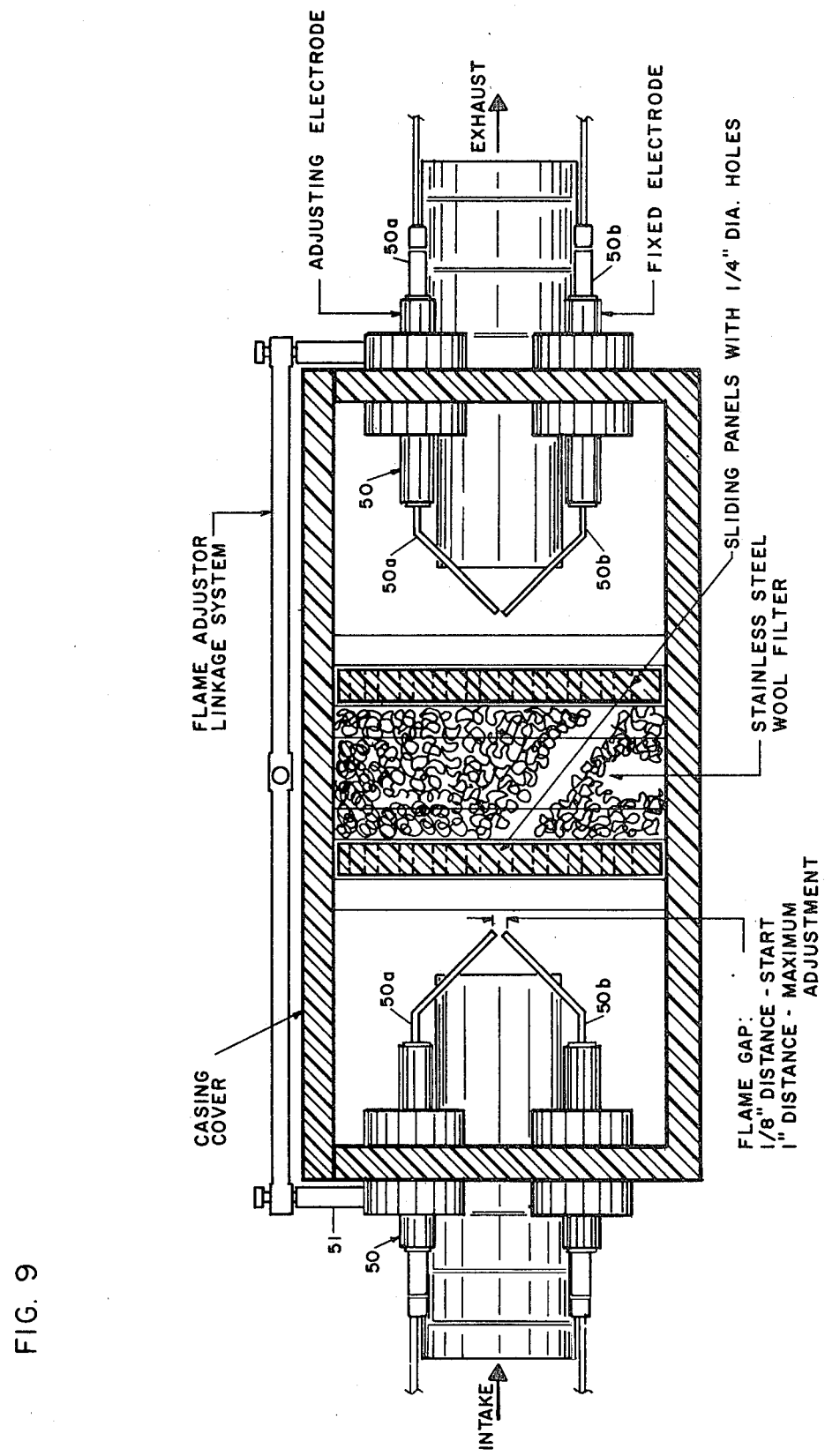
FIG. 9 is a vertical section taken approximately on the line C—C in FIG. 8.

A third embodiment of the invention illustrated in FIGS. 7 to 9 comprises a rectangular casing 41 having opposite side walls 41a, end walls 41b and a bottom 41c. The casing 41 is preferably molded from heat resistant plastic material, for example a phenolic resin such as Bakelite. The casing 41 has a removable cover 42 which is preferably formed of the same material and is secured to the casing by a number of screws 43. The plastic of the casing and cover may be suitably reinforced, for example with fibreglass fibers or fabric. The thickness of the casing and cover is sufficient to provide mechanical strength and also an attenuation of sound waves. Inside the casing 41 are transverse partitions 44 which are slidably and removably received in channels 41d on the inner faces of side walls 41a of the casing. The partitions 44 are located approximately centrally of the casing and are spaced apart to provide between them a compartment containing a filter 45 formed of heat and corrosion resistant fibers or filaments such as stainless steel wool or fibreglass. The partitions 44 are provided with a multiplicity of holes 44a except for a central portion 44b which is imperforate.

One end wall 41b of the casing 41 is provided with a central intake pipe 46. An inner portion 46a of the intake pipe 46 extends inwardly in the casing toward but not to the nearest of the transverse partitions 44. An outer end portion 46b of the intake pipe 46 projects outwardly of the casing for connection to the exhaust pipe of the engine and is surrounded by a protective cover 47. The opposite end wall of the casing is provided with a central exhaust pipe 48 having an inner portion 48a which extends toward but not into the nearest of the partitions 44. An outer portion 48b projects outwardly from the casing for connection to the downstream portion of the exhaust pipe of the engine and is surrounded by a protective cover 49.

Two pairs of electrodes 50 are mounted in one end wall 41b of the casing 41 at opposite sides of the intake pipe 46 and two pairs of electrodes 50 are mounted in the other end wall 41b of the casing 41 at opposite sides of the exhaust pipe 48 as seen in FIGS. 7 and 8. As illustrated in FIG. 9, each pair of electrodes comprises an upper electrode 50a and a lower electrode 50b. The electrodes 50 are of a construction like that illustrated in FIG. 2 or FIG. 6. In operation the lower electrode 50b of each pair is stationary although it may be rotationally adjustable. The upper electrode 50a of each pair is rotatable by means of an arm 51 (FIG. 9) which extends upwardly above the cover of the casing and is connected to a linkage system by means of which the upper electrodes 50a of all of the four pairs of electrodes are simultaneously rotatable. The linkage system is illustrated as comprising cross links 52 connecting upper ends of the arms 51 of the two pairs of electrodes at opposite ends of the casing respectively. The cross links 52 are connected by a link 53 extended longitudinally of the casing and connected at a central point to an actuating slide 54 which is slidably guided by guides 55 provided on the cover 42. The actuating slide 54 is suitably connected, for example by a Bowden wire or linkage, to a control on the dashboard of the vehicle. A tension spring 56 biases the actuating slide 54 in a direction to rotate the upper electrodes to increase the length of the gap between the electrodes of a pair. An adjustable stop on the actuating slide 54 is set to determine the length of the gap when the electrodes are separated. High tension wires or cables 58 supply high voltage current to the electrode pairs as described above.

In operation, the actuating slide 54 is operated, for example from the dashboard, so as to bring the electrodes of each pair close together, for example with a ⅛ inch gap. When a discharge between the electrodes of each pair has been started, the actuating slide 54 is released, whereupon the spring 56 moves the actuating slide in a direction to increase the discharge gap between the electrodes of a pair to a distance of, for example, one inch as determined by the stop 57. Inspection holes closed by plugs 59 are provided in the cover in locations to permit inspection of the flames when the plugs are removed.

By reason of the central portions 44b of the partitions 44 being imperforate, exhaust gases entering the intake pipe 46 flow laterally from the inner end of the intake pipe and hence into the regions of the flames produced by the pairs of electrodes provided at opposite sides of the intake pipe. Any carbon monoxide or unburned hydrocarbons in the exhaust gases are consumed by these flames. The exhaust gases thereupon flow through the filter 45 which serves as a muffling medium and also as a catalyst to continue chemical reactions initiated by the electrode flames. Upon emerging from the filter 45, the exhaust gases are subjected to the flames of the pairs of electrodes provided on opposite sides of the exhaust pipe 48 thereby completing the combustion of combustibles in the exhaust gas if any remain.

While the device illustrated in FIGS. 7 to 9 acts as a muffler as well as providing pollution control, it can if desired be used in series with one or more conventional mufflers connected upstream or downstream of the device or both.

A fourth embodiment of the invention, illustrated in FIGS. 10 to 13, comprises a tubular cylindrical housing 60 having opposite end walls 61 secured by screws 62. Each of the end walls has a circular opening in which is fitted a sleeve 63 for connecting the housing in an exhaust line. At the inlet end, a screen 64 is secured to the end of the sleeve 63 by a screw 65. At one side the housing 60 is provided with an elongated longitudinally extending opening closed by a lid or door 66 mounted on the housing by hinges 67. The door 66 is normally held closed by a coil spring 68 which encircles the housing and is provided with hooked ends so that the spring can be unhooked and removed to permit opening of the door. The housing 60, sleeve 63, and door 66 are conveniently molded or extruded from heat resistant plastic material, for example, a phenolic resin such as Bakelite which may be reinforced, for example, with fiberglass fibers or fabric. The thickness of the housing and door is sufficient to provide mechanical strength and also an attenuation of sound waves.

Figure 10:
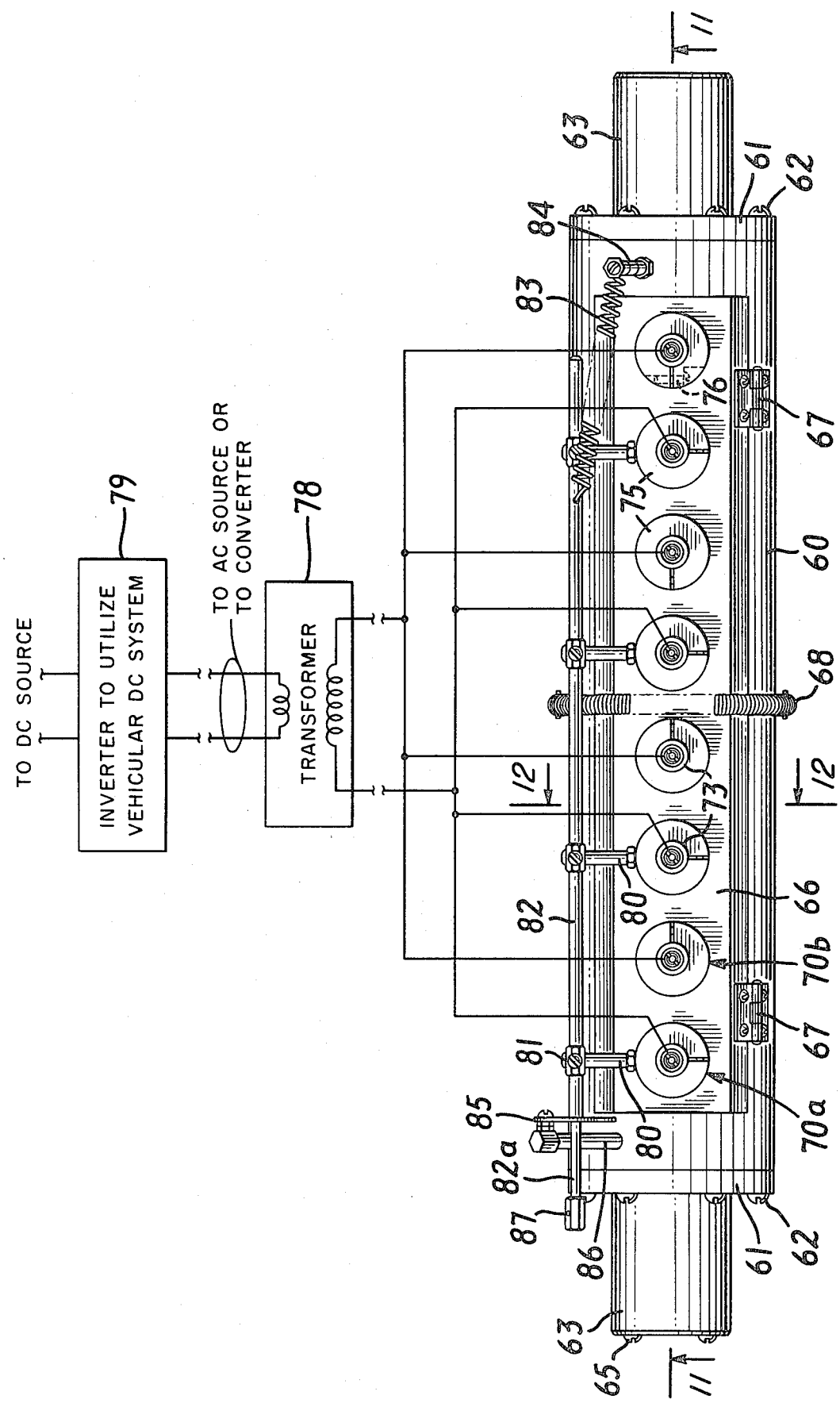
FIG. 10 is a top plan view of a fourth embodiment of the invention with circuitry shown schematically.
Figure 11:
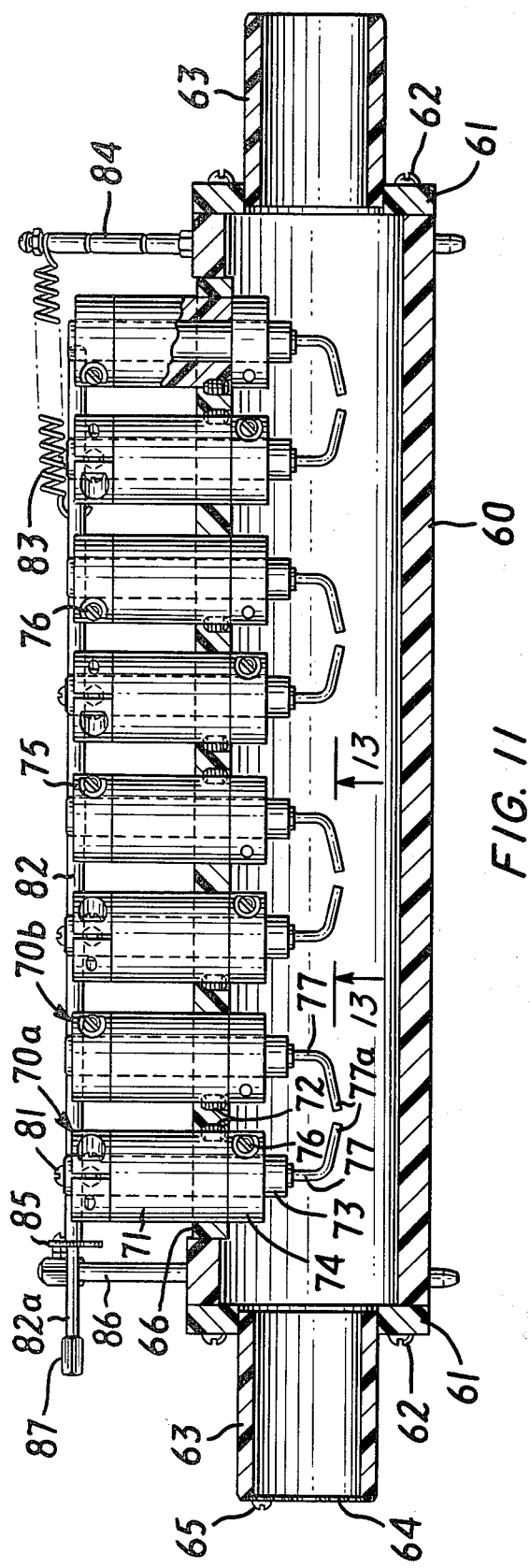
FIG. 11 is a longitudinal section taken on the line 11—11 in FIG. 10.

Two or more pairs of electrode units 70a, 70b are mounted in the door 66 of the housing 60. Four such pairs are shown by way of example in the drawings. Each electrode unit comprises a tubular casing 71 which extends through an opening in the door 66 and is secured by a screw 72. A tubular insulator 73 extends through the casing 71 and is secured by an inner split collar 74 which abuts the inner end of the casing 71, and an outer split collar 75 which abuts the outer end of the casing. Each of the split collars is clamped on the insulator 73 by a screw 76. An electrode 77 extends through the insulator 73 and is suitably sealed to the insulator. An inner end portion 77a of the electrode is bent at an angle of about 75° to the axis of the insulator as seen in FIG. 11. At their outer ends, the electrodes are provided with means for connecting them to a high tension system shown schematically in FIG. 10 as comprising a step-up transformer 10 connected to an AC source or to an inverter 79 supplied from a DC source, for example, the battery of a vehicle. The two electrodes of a pair are connected to opposite poles of the transformer as illustrated in FIG. 10.

Figure 13:
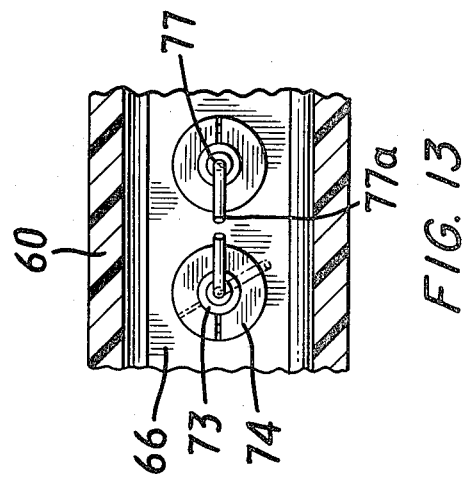
FIG. 13 is a partial longitudinal section taken on the line 13—13 in FIG. 11.
Figure 12:
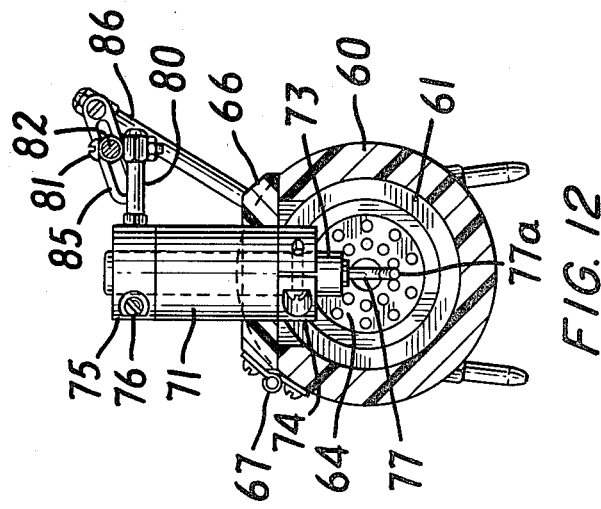
FIG. 12 is a cross section taken on the line 12—12 in FIG. 10.

Means is provided for rotating one electrode of a pair from a position as shown in solid lines in FIG. 13 in which the tips of the electrodes are about one-eighth inch apart, to a position as shown in dot-dash lines in which the gap between the electrode tips is about three-quarter inch to one inch. The rotation of the electrodes is effected by means of an arm 80 which is fixed to and projects radially from the upper split collar 75 of each of the electrode units 70a. To provide for simultaneous rotation of all of the rotatable electrodes, the outer ends of arms 80 are pivotally connected by means of screws 81 to a rod 82 parallel to casing 60 and movable in a lengthwise direction. The rod 82 is biased toward the right as viewed in FIGS. 10 and 11 by a spring 83 having one end connected to the rod 82 and the other end connected to a post 84 which projects out from the casing 60. The post 84 is positioned so that when the rod 82 is moved toward the right by the spring 83, the right-hand end of the rod strikes the post 84 and thereby limits movement of the rod. In this position, the bent inner end portion of each of the rotatable electrodes is in the position shown in dot-dash lines in FIG. 13. A reduced end portion 82a at the left-hand end of rod 82 extends through a slot in a link 85 secured to a post 86 which extends out from the casing 60. Moreover, the left-hand end of the rod 82 is provided with a connection 87 for connecting the rod to a wire cable or other control means for moving the rod toward the left. The slot in the link 85 is only large enough to receive the smaller portion 82a of the rod 82 and hence is engageable with the end of the larger portion of the rod so as to limit movement of the rod to the left so as to bring the in-turned ends of the electrodes of a pair to the position shown in solid lines in FIG. 13 in which the gap is about one-eighth inch.

For convenience and economy of manufacture, all of the electrode units are alike except that the electrode units 70b lack the arms 80. While the electrodes of units 70b are rotatable for the purpose of adjustment, they remain stationary in operation.

The rod 82 is connected to a control means as in the previously described embodiments for bringing the electrodes to the position shown in solid lines in FIG. 13, in which the gap between the electrode tips is about one-eighth inch in order to initiate discharge between the electrodes when the engine is started. As soon as the engine has been started, the rotatable electrodes are returned by the spring 83 to the position shown in dot-dash lines in FIG. 13, in which the gap between the electrode tips is about three-quarter inch to one inch. This provides a continuous flame—as distinct from sparks—between the electrodes. It has been found by tests that such flames are highly effective in burning off combustible contaminants in the exhaust gases such as CO and unburned hydrocarbons. As seen in FIG. 3, the electrode units are positioned so that the tips of the electrodes are located approximately centrally of the tubular casing 60. It has been found that by having at least two, and preferably three or four, pairs of electrode units in series, a remarkable reduction in pollution of the atmosphere can be achieved.

It has been found that with the pollution control device in accordance with the present invention noxious components of the exhaust gases of an automobile engine, for example, carbon monoxide, nitrous oxide, unburned hydrocarbons and free carbon are burned off and thereby eliminated from the exhaust gas. The atmospheric conditions in areas of concentrated automotive traffic are thereby greatly improved. Moreover, this improvement is achieved by a relatively simple, reliable and inexpensive control device.

While preferred embodiments of the invention have been shown in the drawings and are therein particularly described, it will be understood that variations and modifications may be made and hence that the invention is in no way limited to the illustrated embodiments. Moreover, while the invention has been described with particular reference to motor vehicles, it will be understood that the pollution control device in accordance with the present invention is equally applicable to other sources of pollution, such as the flue gases of oil or coal fired furnaces.

What is claimed is:

1. An emission control device for reducing pollution of the atmosphere by automobile engine exhaust gases, comprising in combination, a housing having walls defining a chamber, an inlet for exhaust gases into said chamber, and an outlet for exhaust gases spaced from said inlet to cause exhaust gases to flow through said chamber from said inlet to said outlet, said housing having an opening and a wall portion comprising a cover for said opening movable between open and closed positions, a plurality of pairs of electrode units mounted in said housing and spaced from one another, each of said pairs comprising a first casing mounted in a wall of said housing, a first tubular insulator extending through said casing, a first electrode wire extending through said first insulator and having an inner end portion exposed in said chamber and an outer end portion outside said housing, means providing a pressure-tight seal between said first electrode wire, said first insulator and said first casing, a second casing mounted in the same wall of said housing beside and near said first casing, a second tubular insulator extending through said second casing, a second electrode wire extending through said second insulator and having an inner end portion inside said chamber near the inner end portion of said first electrode wire and an outer end portion outside said housing, means providing a pressure-tight seal between said second electrode wire, said second insulator and said second casing, said first and second tubular insulators and electrode wires being parallel with one another and spaced laterally apart, said inner end portion of at least said second electrode wire being bent at an angle to the axis of said second insulator and said second insulator being rotatable about its axis together with said second electrode wire to move the inner end portion of said second electrode wire toward and away from the inner end portion of said first electrode wire and thereby vary the distance between inner tip portions of said electrode wires, means connected to the outer end portions of said electrode wires for supplying high voltage electric current continuously to said electrode wires of each pair of electrode units to produce a continuous electric discharge between said inner tip portions of the electrode wires of each pair while the engine of said automobile is running, an arm fixed on an outer end portion of said second tubular insulator of each pair of electrode units and extending radially of said second insulator, linkage interconnecting said arms of all of said pairs of electrode units and control means connected with said linkage and operable to rotate all of said second insulators and said second electrode wires to a first position to bring inner tips of said first and second electrode wires of each pair close together to provide a gap of about one eighth inch to initiate discharge between them when the engine is started and thereafter move said tip portions further apart to increase the length of the electric discharge path between them to provide a gap of about one inch and maintain them continuously in said further spaced condition to provide a continuous flame for consuming combustibles in the exhaust gases.

2. An emission control device according to claim 1, in which said control means comprises means coordinated with the starting of the engine for rotating said rotatable second insulators.

3. An emission control device according to claim 1, in which said control means comprises means on the dashboard operable by the driver of said automobile.

4. An emission control device according to claim 1, in which said housing has opposite end walls, a pair of longitudinally spaced transverse partitions extending across said chamber at a location between said end walls, said partitions being perforate except for imperforate central partitions, a filter comprising heat and corrosion resistant fibrous material between said partitions, an intake pipe extending through one of said end walls, an exhaust pipe extending through the other of said end walls, two pairs of said electrode units being provided in said one end wall at opposite sides of said intake pipe, and two pairs of said electrode units being provided in said other end wall at opposite sides of said exhaust pipe, said control means comprising means for simultaneously rotating the rotatable electrodes of all of said pairs of electrode units.

5. An emission control device according to claim 1, in which said housing comprises a muffler casing having baffle means therein so arranged so as to direct exhaust gases successively to said pairs of electrode units.

6. An emission control device according to claim 5, in which said muffler casing is elongated with said inlet at one end and said outlet at the opposite end, and in which a first pair of said electrode units is positioned near said inlet and a second pair of said electrode units is positioned near said outlet, said control means comprising means for simultaneously rotating the rotatable electrodes of both of said pairs.

7. An emission control device according to claim 1, in which said housing is cylindrical, having two end walls connected by a cylindrical wall, with a central inlet opening in one end wall and a central outlet opening in the other end wall, and at least two pairs of said electrode units mounted in one of said end walls around the opening in said end wall, said control means comprising means for simultaneously rotating the rotatable electrodes of all of said pairs.

8. An emission control device according to claim 7, in which said electrode units are mounted in the end wall in which said outlet opening is provided.

9. An emission control device according to claim 8, in which a baffle is mounted in said chamber between said end walls with an annular space between the periphery of said baffle and the cylindrical wall of said chamber.

10. An emission control device according to claim 9, in which said baffle is domed with a convex side facing the end wall of said inlet opening.

11. An emission control device according to claim 9, in which an annular electrical heating element is positioned in a flow path of exhaust gases flowing through said annular space.

12. An emission control device according to claim 1, in which the inner end portion of said first electrode wire is bent symmetrically with the inner end portion of said second electrode wire, said bent portion of said electrode wires extending toward one another at an angle when said second insulator is in said first position.

13. An emission control device according to claim 12, in which the inner end portions of said electrode wires are bent at an angle of about 45° to the portion of said electrode wires extending through said insulators.

14. An emission control device according to claim 12, in which said first casing, first tubular insulator and first electrode wire are identical respectively with said second casing, said second tubular insulator and said second electrode wire, said first insulator together with said first electrode wire being rotatable in said first casing for adjustment but remaining stationary during operation.

15. An emission control device for reducing pollution of the atmosphere by automobile engine exhaust gases, comprising in combination, an elongate cylindrical housing having an exhaust inlet at one end and an exhaust outlet at an opposite end, said housing having in a side wall a longitudinally extending elongate opening, an elongate cover for closing said opening, said cover being movable between a closed position and an open position, a plurality of pairs of electrode units mounted in said cover, said electrode units being aligned in a direction longitudinal of said housing and spaced from one another longitudinally of said housing, each of said pairs comprising a first tubular insulator extending through said cover in a direction radial of said housing, a first electrode wire extending through said first insulator and having an inner end portion inside said housing and an outer end portion outside said housing, means providing a pressure-tight seal between said first electrode wire, said first insulator and said housing, a second tubular insulator extending through said cover in a direction radial of said housing, a second electrode wire extending through said second insulator and having an inner end portion inside said housing and an outer end portion outside said housing, means providing a pressure-tight seal between said second electrode wire, said second insulator and said housing, said second insulator and second electrode wire being parallel to said first insulator and first electrode wire and spaced therefrom in a direction longitudinal of said housing, the inner end portion of at least said second electrode wire being bent at an angle to the axis of said second insulator and said second insulator being rotatable about its axis together with said second electrode wire to vary the distance between inner tips of said first and second electrode, means connected to the outer end portions of said electrode wires for supplying high voltage electric current continuously to said electrode wires of each pair of electrode units to produce a continuous electric discharge between inner end portions thereof while the engine of said automobile is running, an arm fixed on an outer end portion of said second insulator of each pair of electrode units and extending transversely of the longitudinal axis of said housing, linkage interconnecting said arms of all of said pairs of electrode units, and means connected with said linkage and operable to rotate all of said second insulators and second electrode wires to bring inner tips of said first and second electrode wires close together to provide a gap of about one eighth inch to initiate discharge when said engine is started and thereafter to move said tip portions further apart to increase the length of the electric discharge path between them to provide a gap of about one inch and to maintain them continuously in said further spaced apart condition while the engine is running to provide a continuous flame for consuming combustibles in the exhaust gases.

16. An emission control device according to claim 15, in which said cover is hinged along one side to said housing to swing from a closed position to an open position in which inner end portions of said electrode wires are accessible for inspection and adjustment.

17. An emission control device according to claim 15 or 16, in which an inner end portion of said first electrode wire of each pair is bent at an angle to the axis of said first insulator, and said first insulator together with said first electrode wire is rotatable for adjustment, but remains stationary during operation of the engine.

18. An emission control device according to claim 17, in which each of said insulators is rotatable in a tubular casing which extends through an opening in said cover and is secured therein.

* * * * *